United States Patent
Kobayakawa et al.

(10) Patent No.: US 10,855,089 B2
(45) Date of Patent: Dec. 1, 2020

(54) CHARGING CONTROL DEVICE FOR SUITABLY PERFORMING CHARGING REGARDLESS OF CHARGER TYPE

(71) Applicant: MAKITA CORPORATION, Anjo (JP)

(72) Inventors: Tadahiko Kobayakawa, Anjo (JP); Junichi Katayama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 81 days.

(21) Appl. No.: 16/161,507

(22) Filed: Oct. 16, 2018

(65) Prior Publication Data

US 2019/0123569 A1    Apr. 25, 2019

(30) Foreign Application Priority Data

Oct. 23, 2017 (JP) .................................. 2017-204445

(51) Int. Cl.
*H02J 7/00* (2006.01)
*H01M 10/44* (2006.01)

(52) U.S. Cl.
CPC ....... *H02J 7/00036* (2020.01); *H01M 10/443* (2013.01); *H02J 7/007* (2013.01); *H02J 7/0029* (2013.01); *H02J 7/0071* (2020.01); *H02J 7/00302* (2020.01); *H02J 7/00304* (2020.01); *H02J 7/00308* (2020.01); *H02J 7/00309* (2020.01); *H02J 7/007192* (2020.01); *H02J 7/007194* (2020.01)

(58) Field of Classification Search
CPC ............... H02J 7/00036; H02J 7/00304; H02J 7/00302; H02J 7/0029; H02J 7/00309; H02J 7/00308; H02J 7/0013; H02J 7/007192; H02J 7/007194; H02J 7/0071; H02J 7/007; H01M 10/443
See application file for complete search history.

(56) References Cited

U.S. PATENT DOCUMENTS

| | | | | |
|---|---|---|---|---|
| 6,194,869 | B1 * | 2/2001 | Peterzell | H02H 7/18 320/134 |
| 6,271,643 | B1 * | 8/2001 | Becker | H01M 10/48 320/112 |
| 6,326,767 | B1 * | 12/2001 | Small | H01M 2/1055 320/116 |

(Continued)

FOREIGN PATENT DOCUMENTS

| | | |
|---|---|---|
| EP | 2 961 025 A1 | 12/2015 |
| JP | 2016-010198 A | 1/2016 |

OTHER PUBLICATIONS

Mar. 13, 2019 extended European Search Report issued in European Patent Application No. 18201097.5.

*Primary Examiner* — Naum Levin
(74) *Attorney, Agent, or Firm* — Oliff PLC

(57) ABSTRACT

A charging control device includes a detector detecting a temperature of a battery; a controller causing the charger to stop charging the battery in response to the temperature of the battery falling outside a first range during the charging of the battery; an obtainer obtaining, from the charger, information that is capable of identifying a charging characteristic of the charger; a range setter setting the first range to be a temperature range that corresponds to the charging characteristic of the charger based on the information obtained in the obtainer.

16 Claims, 6 Drawing Sheets

(56) References Cited

U.S. PATENT DOCUMENTS

| | | | | |
|---|---|---|---|---|
| 6,433,515 B2* | 8/2002 | Sakakibara | H02J 7/00 | 320/137 |
| 6,674,265 B2* | 1/2004 | Yoshida | B60L 58/13 | 320/125 |
| 7,176,654 B2* | 2/2007 | Meyer | H02J 7/0036 | 320/110 |
| 7,521,897 B2* | 4/2009 | Wolf | H02J 7/0047 | 320/150 |
| 7,541,780 B2* | 6/2009 | Nagasawa | H02J 7/0029 | 320/150 |
| 7,560,902 B2* | 7/2009 | Unger | H02J 7/022 | 320/125 |
| 7,570,025 B2* | 8/2009 | Kim | G01R 31/36 | 320/150 |
| 7,589,500 B2* | 9/2009 | Johnson | H01M 10/482 | 320/134 |
| 8,093,867 B2* | 1/2012 | Sato | H01M 10/443 | 320/150 |
| 8,339,095 B2* | 12/2012 | Hayashi | H01M 10/441 | 320/106 |
| 8,639,954 B2* | 1/2014 | Winkler | H02J 7/0068 | 713/300 |
| 8,952,561 B2* | 2/2015 | Seol | B62M 6/45 | 307/9.1 |
| 8,963,496 B2* | 2/2015 | Yang | H01M 10/052 | 320/113 |
| 8,981,731 B1* | 3/2015 | Oku | H02J 7/0029 | 320/150 |
| 9,099,877 B2* | 8/2015 | Banos | H02J 7/0016 | |
| 9,130,381 B2* | 9/2015 | Li | H02J 7/00036 | |
| 9,331,365 B2* | 5/2016 | Cruise | H01M 10/425 | |
| 9,356,464 B2* | 5/2016 | Tomiyasu | H02J 7/0091 | |
| 9,365,128 B2* | 6/2016 | Sarkar | B60L 50/40 | |
| 9,784,795 B2* | 10/2017 | Umemura | H02J 7/0044 | |
| 10,222,424 B2* | 3/2019 | Umemura | H02J 7/00041 | |
| 10,306,381 B2* | 5/2019 | Sandhu | H02J 7/0042 | |
| 10,408,884 B2* | 9/2019 | Willey | G01R 31/3648 | |
| 10,492,010 B2* | 11/2019 | Rucker | H04R 25/606 | |
| 2009/0195215 A1* | 8/2009 | Sato | H01M 10/443 | 320/150 |
| 2010/0315037 A1* | 12/2010 | Aiura | H02J 7/0047 | 320/107 |
| 2015/0372512 A1* | 12/2015 | Umemura | H02J 7/0044 | 320/112 |
| 2018/0097376 A1* | 4/2018 | Renaud-Byrne | H02J 7/0036 | |
| 2018/0109120 A1* | 4/2018 | Nakao | H02J 7/008 | |
| 2018/0267586 A1* | 9/2018 | Jung | H02J 7/0071 | |
| 2019/0036178 A1* | 1/2019 | Karner | H01M 10/482 | |

* cited by examiner

CHARGING CONTROL DEVICE FOR SUITABLY PERFORMING CHARGING REGARDLESS OF CHARGER TYPE

CROSS-REFERENCE TO RELATED APPLICATIONS

This application claims the benefit of Japanese Patent Application No. 2017-204445 filed on Oct. 23, 2017 with the Japan Patent Office, the entire disclosure of which is incorporated herein by reference.

BACKGROUND

The present disclosure relates to a charging control device that stops charging in response to a temperature of a battery falling outside a permissible temperature range during battery charge, and a battery pack and a charger having such a function of the charging control device.

According to Japanese Unexamined Patent Application Publication No. 2016-10198, disclosed is to define a value of a charging current in a battery such as a lithium ion battery and the like in accordance with a temperature range of the battery.

This is to both ensure safety during charging and to inhibit reduction of a battery life due to the charging. A charging control device that controls charging of a battery of this type is configured to stop charging in response to a temperature of the battery falling outside a permissible range.

SUMMARY

A charger that is capable of charging the aforementioned battery includes chargers having respective charging characteristics that differ from each other (for example, characteristics associated with a charging current and the like).

In order for any charger to enable, regardless of its charging characteristic, charging of a battery, it is necessary to permit the charging in charging control device if a temperature of the battery falls within a specific range.

A temperature range of the battery in which the charging is permitted may be limited in this way. This case, however, has a result that chargeable environment is limited. Consequently, there arises a problem in which a charger of a certain type cannot sufficiently exhibits its charging ability.

In the present disclosure, it is desirable to suitably perform the charging regardless of a charger type.

In one aspect of the present disclosure, a charging control device includes a detector, a controller, an obtainer, and a range setter.

The detector detects a temperature of a battery. The controller causes a charger to stop charging the battery in response to the temperature of the battery detected in the detector failing outside a first range during charging of the battery by the charger. The first range is used for the controller to cause the charging of the battery to be stopped.

Further, the obtainer obtains from the charger information that is capable of identifying a charging characteristic of the charger. The range setter sets, based on the information obtained in the obtainer, the first range to be a temperature range that corresponds to the charging characteristic of the charger.

Accordingly, with the charging control device of the present disclosure, it is possible to set the temperature range of the battery that enables the charging to be proper for the battery in accordance with the charging characteristic of the charger.

In other words, the charging control device of the present disclosure sets the temperature range that permits the charging in correspondence with the charger to be used for the charging. Therefore, it is possible to inhibit a chargeable environment from being limited more than necessary due to excessive limitation of the temperature range for the charging characteristic of the charger. Here, the chargeable environment refers to an environment that enables the charging of the battery. In addition, it is possible to effectively use chargers with respective charging characteristics that are different from each other. Consequently, it is possible to perform the charging of the battery with efficiency.

Therefore, it is possible to suitably perform the charging regardless of a charger type.

The controller may include a determiner and a stopper. The determiner may determine, during the charging of the battery by the charger, whether the temperature of the battery detected in the detector falls outside the first range. The stopper may cause the charger to stop charging the battery based on a determination result derived from the determiner.

In this case, the detector, the determiner, the obtainer, and the range setter may be included in a battery pack that contains the battery, and the stopper may be included in the charger.

Even where the battery pack and the charger are configured in such a manner, it is possible to achieve a function as the charging control device of the present disclosure. Thus, it is possible to suitably perform the charging regardless of the charger type.

Further, the determiner may determine whether the temperature of the battery detected in the detector falls outside a second range in starting the charging of the battery by the charger. The stopper may cause the charger not to start charging the battery in response to determination by the determiner that the temperature of the battery fails outside the second range in starting the charging of the battery. The range setter may set, based on the information obtained in the obtainer, the second range to be a temperature range that corresponds to the charging characteristic of the charger.

With such a configuration, the temperature range, which enables the charging to be started, is set in correspondence with the charger. Therefore, it is possible to inhibit the chargeable environment from being limited more than necessary due to the excessive limitation of the temperature range for the charging characteristic of the charger. Accordingly, it is possible to suitably perform the charging regardless of the charger type.

Further, the determiner may repeatedly determine, during the charging of the battery by the charger, whether the temperature of the battery detected in the detector falls outside the first range.

With such a configuration, it is possible to more suitably determine, during the charging of the battery, whether to stop charging the battery.

The range setter may include a parameter setter and a charger setter. The parameter setter may set, based on the information obtained in the obtainer, a setting parameter required for setting the first range. The charger setter may set the first range based on the setting parameter set in the parameter setter.

In this case, the detector, the obtainer, and the parameter setter may be included in the battery pack that contains the battery, and the controller and the charger setter may be included in the charger.

Even where the battery pack and the charger are configured in such a manner, it is possible to achieve the function as the charging control device of the present disclosure. Thus, it is possible to suitably perform the charging regardless of the charger type.

The controller may be configured to determine whether the temperature of the battery detected in the detector falls outside the second range in starting the charging of the battery by the charger and to cause, in response to a positive determination, the charger not to start charging the battery. The parameter setter may set, based on the information obtained in the obtainer, a setting parameter required for setting the second range to be a temperature range that corresponds to the charging characteristic of the charger. The charger setter may set the second range based on the setting parameter set in the parameter setter.

With such a configuration, the temperature range that enables the charging to be started is set in correspondence with the charger. Therefore, it is possible to inhibit the chargeable environment from being limited more than necessary due to the excessive limitation of the temperature range for the charging characteristic of the charger. Accordingly, it is possible to suitably perform the charging regardless of the charger type.

Further, the controller may repeatedly determine, during the charging of the battery by the charger, whether the temperature of the battery detected in the detector falls outside the first range.

With such a configuration, it is possible to more suitably determine, during the charging of the battery, whether to stop charging the battery.

A minimum value of the second range may be equal to or greater than a minimum value of the first range, and a maximum value of the second range is equal to or smaller than a maximum value of the first range.

With such a configuration, it is possible to suitably determine whether to permit the charging of the battery to be started and whether to stop charging the battery.

Further, the charger may include an outputer that is configured to output the information that is capable of identifying the charging characteristic of the charger in response to the charger being coupled to the battery. The obtainer may obtain the information that is outputted from the outputer and is capable of identifying the charging characteristic of the charger.

With such a configuration, it is possible to suitably recognize the charging characteristic of the charger in starting the charging.

Further, the charging characteristic may be associated with a charging current or a charging voltage outputted from the charger.

With such a configuration, it is possible to suitably perform the charging regardless of the charging current or the charging voltage outputted from the charger.

Further, the battery may be used for a power equipment for working sites. In other words, the battery pack that contains the battery may be attached to the power equipment for working sites. The power equipment for working sites refers to an electric apparatus used for working sites, such as home carpentry, manufacturing, gardening, and construction. Specifically, the power equipment for working sites may be, for example, a power tool for stone processing, metal processing, or wood processing, a working machine for gardening, or an electric apparatus for improving a workplace environment. More specifically, the power equipment for working sites may include, for example, an electric hammer, an electric hammer drill, an electric drill, an electric driver, an electric wrench, an electric grinder, an electric circular saw, an electric reciprocating saw, an electric jig saw, an electric cutter, an electric chainsaw, an electric plane, an electric nail gun (including a tacker), an electric hedge trimmer, an electric lawn mower, an electric grass trimmer, an electric weed whacker, an electric cleaner, an electric blower, an electric sprayer, an electric spreader, an electric dust collector, a work light, or an audio device for work sites, such as a radio and a speaker.

Further, a battery pack may include a battery, a detector, a determiner, an obtainer, and a range setter. The detector may detect a temperature of the battery. The determiner may be configured to determine, during charging of the battery by a charger, whether the temperature of the battery detected in the detector falls outside a first range. The first range is used by the determiner for determination. The obtainer may be configured to obtain, from the charger, information that is capable of identifying a charging characteristic of the charger. The range setter may be configured to set, based on the information obtained in the obtainer, the first range to be a temperature range that corresponds to the charging characteristic of the charger.

Further, a charger, which is configured to charge the battery contained in the battery pack, may include a stopper configured to cause the charger to stop charging the battery based on a determination result derived from the determiner that is included in the battery pack.

Further, a battery pack may include a battery, a detector, an obtainer, and a parameter setter. The detector may detect a temperature of the battery. The obtainer may be configured to obtain, from a charger, information that is capable of identifying a charging characteristic of the charger. The parameter setter may be configured to set a setting parameter required for setting a first range based on the information obtained in the obtainer. The first range is a temperature range that enables charging of the battery.

Further, a charger, which is configured to charge the battery contained in the battery pack, may include a controller and a charger setter. The controller may be configured to obtain the temperature of the battery from the detector included in the battery pack and to cause the charging of the battery to be stopped in response to the temperature falling outside the first range during the charging of the battery. The first range is used for the controller to cause the charging of the battery to be stopped. The charger setter may be configured to obtain a setting parameter from the parameter setter included in the battery pack and to set the first range based on the setting parameter.

The aforementioned chargers and battery packs may be independently distributed. Even in this case, combined use of the charger and the battery pack can similarly bring the aforementioned effects.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

First Embodiment

Figure 1:
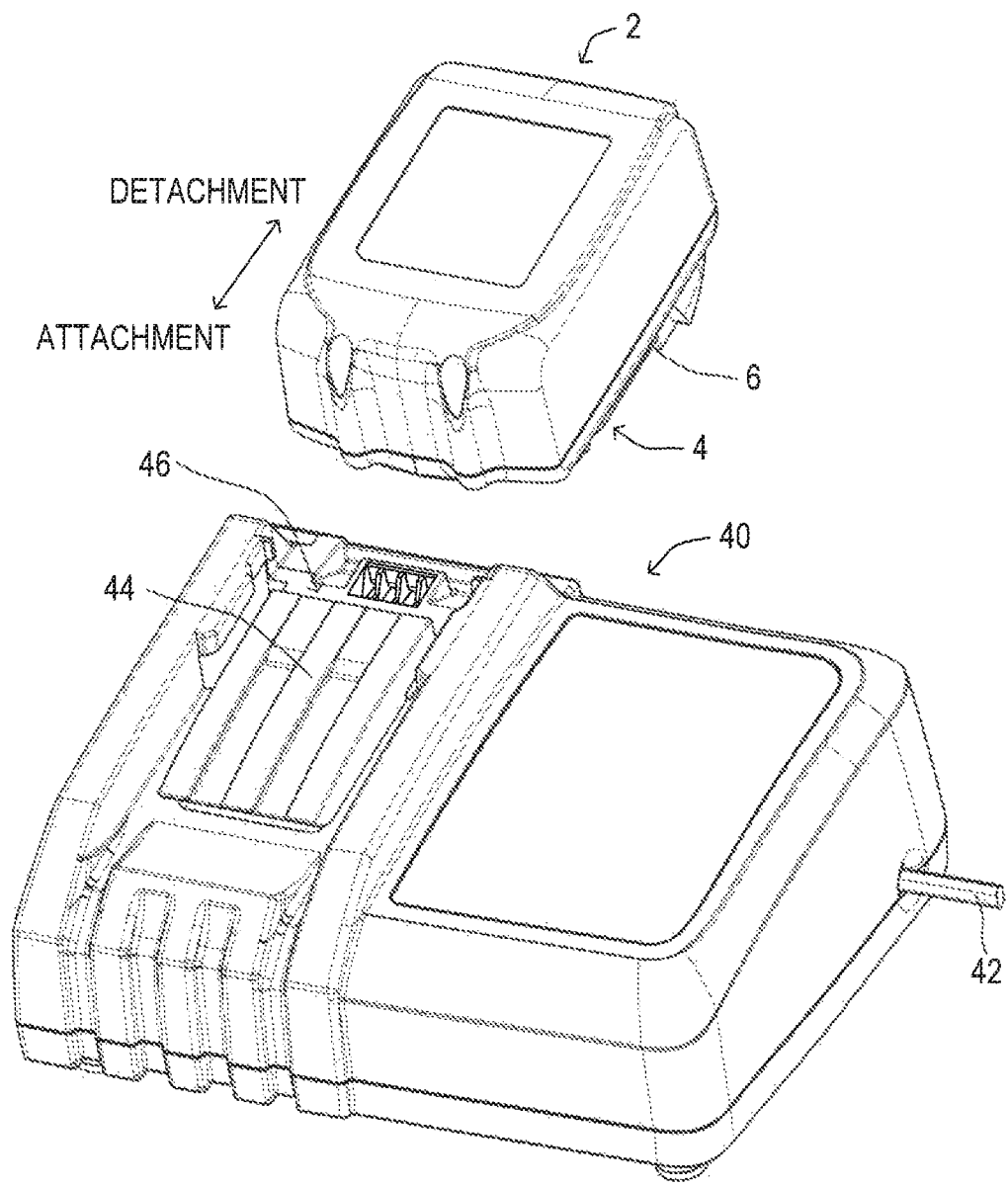
FIG. 1 is a perspective view showing respective appearances of a battery pack and a charger of a first embodiment.

As shown in FIG. 1, a charging system of a first embodiment includes a battery pack 2 and a charger 40.

The battery pack 2 is attached, in a freely attachable and detachable manner, to various electric working machines, such as a rechargeable power tool, a rechargeable cleaner, and a rechargeable glass mower, or a power equipment for work sites so as to supply electric power to a direct current motor or the like that is a power source of each machine or the equipment mentioned above.

The charger 40 is supplied with electric power from an external power supply (for example, a commercial power source or an AC power source) via a power cord 42. In response to this, the charger 40 generates a direct charging voltage for battery charge, to thereby charge a battery 10 located in the battery pack 2 (see, FIG. 2).

Therefore, an upper surface of the charger 40 includes an attachment portion 44 for attaching thereto (in other words, for mounting thereon) the battery pack 2. The attachment portion 44 has a shape corresponding to an attachment portion 4, which is an underside of the battery pack 2, so that the battery pack 2 can be slidably attached to the attachment portion 44.

In addition, the attachment portion 44 has a terminal portion 46 that can be engaged with a terminal portion 6 located in the underside of the battery pack 2 during attachment of the battery pack 2 to the attachment portion 44.

Figure 2:
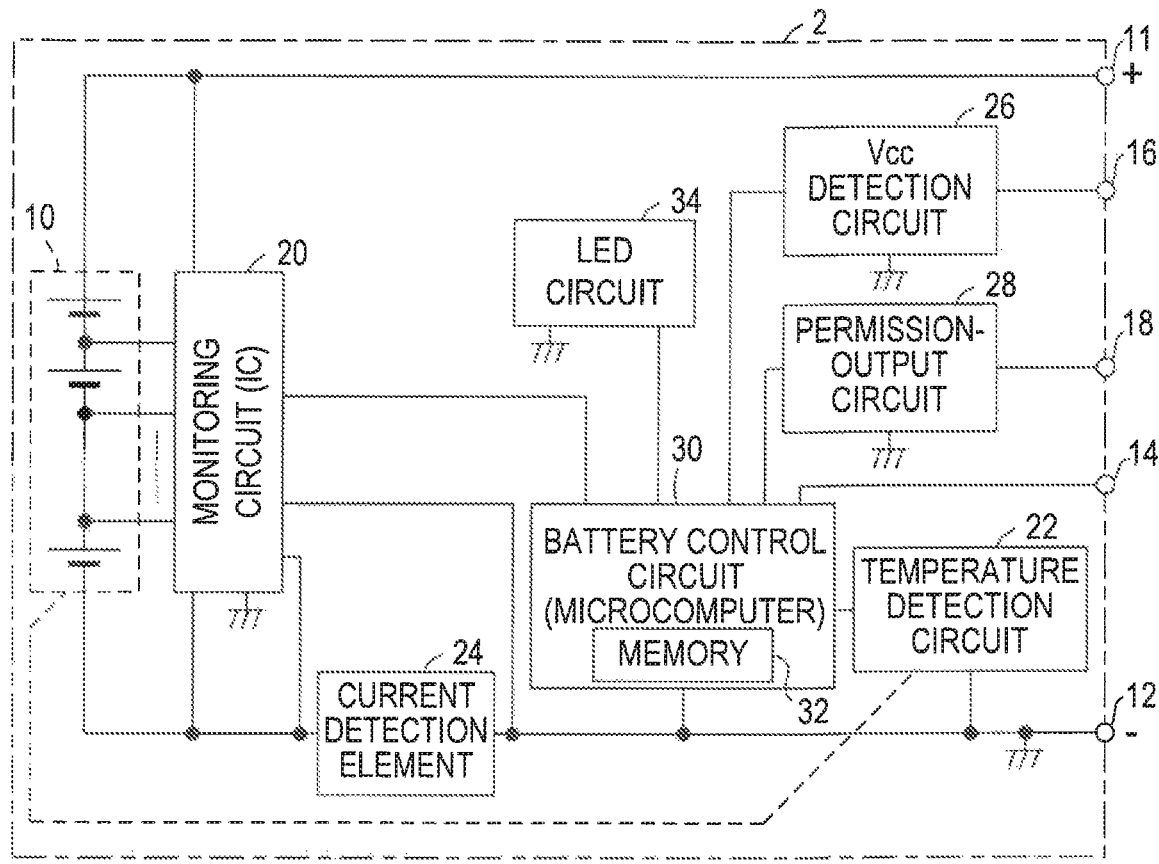
FIG. 2 is a block diagram showing a circuit configuration of the battery pack of the first embodiment.
Figure 3:
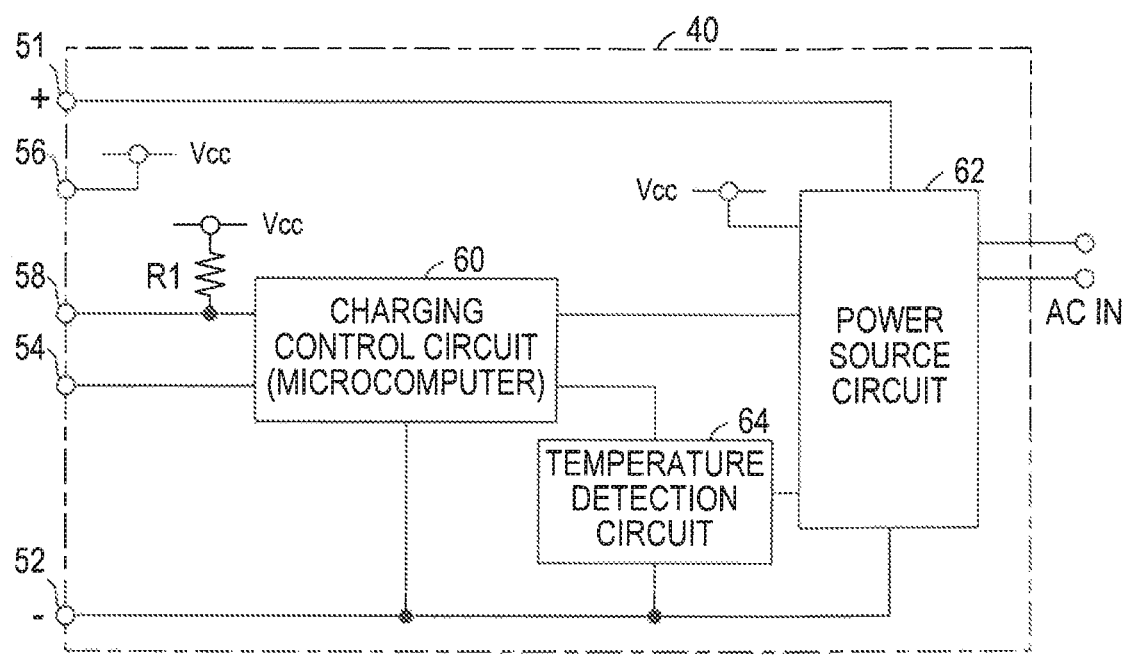
FIG. 3 is a block diagram showing a circuit configuration of the charger of the first embodiment.

The terminal portion 46 of the charger 40 and the terminal portion 6 of the battery pack 2, respectively, include terminals 51 to 58 and terminals 11 to 18 (see, FIGS. 2 and 3). The respective terminals included in the terminal portions 46 and 6 are mutually coupled to each other as the battery pack 2 is attached to the attachment portion 44 of the charger 40.

Specifically, in the battery pack 2, the terminal 11 is a positive-electrode terminal, which is connected to a positive side of the battery 10, and the terminal 12 is a negative-electrode terminal, which is connected to a negative side of the battery 10. The terminals 11 and 12 are used to carry a charging current flowing from the charger 40 or a discharge current flowing to the electric working machine.

The terminal 14 is used to perform communication with the charger 40 or with the electric working machine; the terminal 16 is inputted with a power supply voltage Vcc of the charger 40; and the terminal 18 outputs a permission signal.

In the charger 40, the terminals 51 and 52, respectively, are a positive-electrode terminal and a negative-electrode terminal for charging the battery 10. The terminals 51 and 52, respectively, are connected to the terminals 11 and 12 of the battery pack 2 as the battery pack 2 is attached to the attachment portion 44.

The terminal 54 is connected to the terminal 14 of the battery pack 2 and is used to communicate with the battery pack 2. The terminal 56 is connected to the terminal 16 of the battery pack 2 to output the power supply voltage Vcc generated in the charger 40. The terminal 58 is connected to the terminal 18 of the battery pack 2, so that the permission signal is inputted to the terminal 58.

Respective circuit configurations of the battery pack 2 and the charger 40 will now be explained with reference to FIGS. 2 and 3.

As shown in FIG. 2, the battery 10 located in the battery pack 2 includes chargeable and dischargeable cells, which are connected in series. The positive side of the battery 10 is connected to the terminal 11, whereas the negative side the battery 10 is connected to the terminal 12.

The battery pack 2 includes therein a monitoring circuit (IC) 20 and a temperature detection circuit 22, the monitoring circuit 20 monitoring a voltage across the battery 10 (battery voltage) and/or a voltage of each cell (cell voltage), and the temperature detection circuit 22 detecting a temperature of at least one of the cells (cell temperature) in the battery 10. Specifically, the temperature detection circuit 22 includes, for example, a thermistor or the like in which a resistance value changes based on a temperature thereof.

A current path, which is situated between a negative electrode-side of the battery 10 and the terminal 12, includes, for example, a current detection element 24 having a resistance. The monitoring circuit 20 detects a voltage across the current detection element 24, to thereby monitor the charging current flowing to the battery 10 and the discharge current flowing from the battery 10.

A monitoring result derived from the monitoring circuit 20 (for example, the battery voltage, the cell voltage, the charging current, or the discharge current) and a detection result derived from the temperature detection circuit 22 (for example, the cell temperature) are inputted to a battery control circuit 30.

The battery control circuit 30 includes a microcomputer that includes a CPU, a ROM, a RAM, and the like, and a memory 32 that stores a various information. Here, the memory 32 is a non-volatile memory.

The battery pack 2 further includes a Vcc detection circuit 26, a permission-output circuit 28, and a LED circuit 34. These circuits each are connected to the battery control circuit 30.

The Vcc detection circuit 26 detects a power supply voltage Vcc that is inputted from the charger 40 to the terminal 16 and the detection result derived therefrom is inputted to the battery control circuit 30.

In accordance with a command from the battery control circuit 30, the permission-output circuit 28 outputs a start-permission signal and a completion-permission signal to the charger 40 through the terminal 18. Here, the start-permission signal permits charging of the battery 10 to be started, and the completion-permission signal permits the charging of the battery 10 to be completed.

In accordance with a command from the battery control circuit 30, the LED circuit 34 controls a lighting state of a LED used for displaying a remaining energy, to thereby display the remaining energy of the battery 10. Here, the remaining energy is an amount of electricity remaining in the battery 10 (in other words, a remaining amount of charge).

The charger 40 includes a power source circuit 62 and a charging control circuit 60. With alternating current power supplied form an external power supply, the power source circuit 62 generates a charging voltage required for charging the battery 10 and outputs the charging voltage through the terminals 51 and 52. The charging control circuit 60 controls output from the power source circuit 62.

As with the battery control circuit 30, the charging control circuit 60 includes a microcomputer.

While the battery pack 2 is coupled to the charger 40, the charging control circuit 60 communicates with the battery control circuit 30 with which the charging control circuit 60 is coupled through the terminals 54 and 14, to thereby control the charging of the battery 10.

In addition, while the battery pack 2 is attached to the charger 40, the charging control circuit 60 commands the power source circuit 62 to start or stop charging the battery 10 in accordance with the permission signal inputted to the terminal 58 from the terminal 18 of the battery pack 2. Here, the permission signal refers to the start-permission signal or the completion-permission signal.

The power source circuit 62 starts outputting the charging voltage in accordance with a command from the charging control circuit 60 for starting the charging, and stops outputting the charging voltage in accordance with a command from the charging control circuit 60 for stopping the charging.

In addition, during the charging of the battery 10, the charging control circuit 60 outputs a command value of the charging current to the power source circuit 62 and the power source circuit 62 outputs the charging current corresponding to the command value.

Here, a charging path from the power source circuit 62 to the battery 10 may include an interruption element, such as a FET and a relay. In this case, the charging control circuit 60 may execute start or end of the charging of the battery 10 by switching on or off the interruption element.

Further, an input path of the permission signal from the terminal 58 to the charging control circuit 60 is coupled to a power-supply line (power supply voltage Vcc) situated within the charger 40 via a resistor R1.

Thus, when the battery pack 2 is not coupled to the charger 40, a voltage inputted from the terminal 58 to the charging control circuit 60 is the power supply voltage Vcc. In this way, the charging control circuit 60 is able to detect that the battery pack 2 is not coupled the charger based on a voltage value of the terminal 58.

The power source circuit 62 of the charger 40 generates a power supply voltage Vcc (for example, 5 volts DC) of the charging control circuit 60 in addition to generation of the charging voltage of the battery 10. Then, the power supply voltage Vcc is outputted from the terminal 56 to the terminal 16 of the battery pack 2.

Thus, in the battery pack 2, the Vcc detection circuit 26 detects that the power supply voltage Vcc of the charger 40 is applied to the terminal 16, which leads to detection that the battery pack 2 is coupled to the charger 40.

The charger 40 is provided with a temperature detection circuit 64 that detects a temperature of the power source circuit 62. A detection signal from the temperature detection circuit 64 is inputted to the charging control circuit 60.

If the temperature detected in the temperature detection circuit 64 is high, then the charging control circuit 60 decreases the command value of the charging current that is outputted to the power source circuit 62, to thereby reduce the charging current flowing to the battery 10.

Next, a description is given to respective charging control processes that are executed for charging the battery 10 in the battery control circuit 30 located within the battery pack 2 and in the charging control circuit 60 located within the charger 40.

The battery control circuit 30 operates using the battery voltage. In response to decrease in the battery voltage, however, the battery control circuit 30 operates using the power supply voltage Vcc inputted from the charger 40 through the terminal 16. The battery control circuit 30 repeatedly performs the charging control process (executed in the battery pack 2) described in the left side of FIG. 4 as one of main processes.

Figure 4:
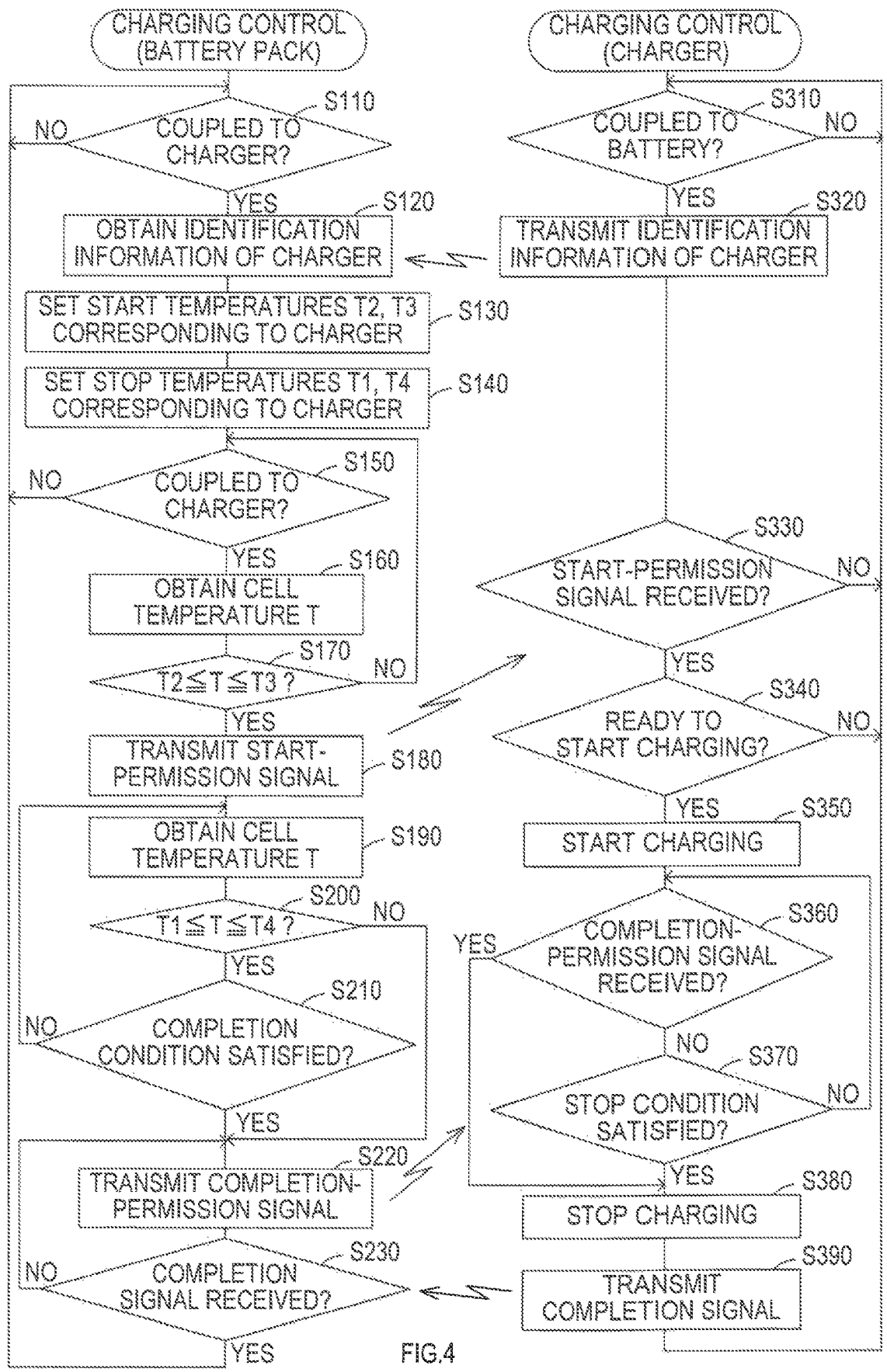
FIG. 4 is a flowchart of a charging control process executed in a battery control circuit and a charging control circuit of the first embodiment.

The charging control circuit 60 operates using the power supply voltage Vcc outputted from the power source circuit 62 and repeatedly executes the charging control process (executed in the charger 40) described in the right side of FIG. 4 as one of main processes.

As shown in FIG. 4, in S110, the battery control circuit 30 determines whether the battery pack 2 is coupled to the charger 40 based on a detection signal of the power supply voltage Vcc from the Vcc detection circuit 26. The battery control circuit 30 repeatedly makes such determination while waiting for the charger 40 to be coupled to the battery pack 2.

In response to determination that the battery pack 2 is coupled to the charger 40, the battery control circuit 30 proceeds to S120. The battery control circuit 30 obtains identification information of the charger 40 from the charging control circuit 60 through communication with the charging control circuit 60.

The identification information is used for setting temperature ranges (a first range and a second range) for charging the battery 10 in the subsequent S130 and S140 in accordance with a charging characteristic of the charger 40 to which the battery pack 2 is attached at present. Here, the charging characteristic may be associated with, for example, the charging current or the charging voltage of the charger 40.

Thus, the identification information can be any information that is capable of identifying a charging characteristic of a charger. For example, the identification information may be information uniquely distributed to individual charger 40, or information indicating a type of the charger 40. Alternatively, the identification information may be information indicating the charging characteristic of the charger 40.

In response to obtainment in S120 of the identification information of the charger 40, the battery control circuit 30 proceeds to S130 to set, based on the identification information, start temperatures T2 and T3 that are used for determining whether it is possible to start charging the battery 10.

These start temperatures T2 and T3 define the second range, which is the temperature range that permits the charging of the battery 10 to be started. The start temperature T2 is a minimum value of the second range and the start temperature T3 is a maximum value of the second range.

In the subsequent S140, the battery control circuit 30 sets stop temperatures T1 and T4 after the charging of the battery 10 is started based on the identification information obtained in S120. The stop temperatures T1 and T4 are used for determining whether to stop charging the battery 10.

These stop temperatures T1 and T4 define the first range, which is the temperature range that permits the charging of the battery 10 to continue. The stop temperature T1 is a minimum value of the first range and the stop temperature T4 is a maximum value of the first range.

Here, the second range defined by the start temperatures T2 and T3 is narrower than or equal to the first range defined by the stop temperatures T1 and T4. That is, a relationship among the temperatures T1 to T4 is as follows: $T1 \leq T2 \leq T3 \leq T4$. The relationship among the temperatures T1 to T4 may be as follows: $T1 < T2 < T3 < T4$.

Furthermore, a plurality of the temperatures T1 to T4 (T1, T2, T3, and T4) are predetermined to be suitable for charging the battery 10 in accordance with the identification information that can be obtained in S120, in other words, in accordance with the charging characteristic of the charger 40 that can be used for the charging. That is, the plurality of the temperatures T1 to T4, which correspond to the charging characteristic, are stored in a memory.

In S130 and S140, the temperatures T1 to T4, which correspond to the charging characteristic of the charger 40 identified through the identification information, are read from the memory 32 among the multiple temperatures T1 to T4.

In this regard, the identification information of the charger 40 is obtained from the charging control circuit 60 through the communication of the battery control circuit 30 with the charging control circuit 60 in S120. However, if the charger 40 is outmoded and therefore does not transmit the identification information, it is not possible to obtain the identification information.

Therefore, if the identification information of the charger 40 is not obtainable in S120, S130 and S140 set start temperatures T2 and T4 and stop temperatures T1 and T4 that are preset for an existing charger.

In this way, the temperatures T1 to T4 are set in S130 and S140. In response to this, the battery control circuit 30 proceeds to S150. In S150, the battery control circuit 30 determines whether the battery pack 2 is coupled to the charger 40 based on the detection signal of the power supply voltage Vcc from the Vcc detection circuit 26.

In response to determination that the battery pack 2 is not coupled to the charger 40 (in other words, the battery pack 2 is removed from the charger 40), the battery control circuit 30 proceeds to S110.

In response to determination in S150 that the battery pack 2 is coupled to the charger 40, the battery control circuit 30 obtains in S160 a present cell temperature T of the battery 10 from the temperature detection circuit 22.

In the subsequent S170, the battery control circuit 30 determines whether an obtained cell temperature T falls within the second range, which is defined by the start temperatures T2 and T3, in other words, whether the cell temperature T satisfies T2≤T≤T3.

If the cell temperature T does not fall within the second range, then the battery control circuit 30 proceeds to S150. On the other hand, if the cell temperature T falls within the second range, the battery control circuit 30 proceeds to S180 to cause the permission-output circuit 28 to transmit the start-permission signal to the charging control circuit 60.

In contrast, the charging control circuit 60 determines in S310 whether the battery pack 2 is coupled to the charger 40 based on the voltage of the terminal 58. As a result, the charging control circuit 60 waits until the battery pack 2 is coupled to the charger 40.

In response to determination that the battery pack 2 is coupled to the charger 40, the charging control circuit 60 proceeds to S320. In S320, the charging control circuit 60 transmits the identification information of the charger 40 to the battery control circuit 30 through the communication with the battery control circuit 30 and then proceeds to S330.

Within a specified wait-time after transmitting the identification information, the charging control circuit 60 determines in S330 whether the charging control circuit 60 receives the start-permission signal that is inputted thereto from the battery pack 2 through the terminal 58. If not receiving the start-permission signal, then the charging control circuit 60 proceeds to S310. If receiving the start-permission signal, then the charging control circuit 60 proceeds to S340.

In S340, the charging control circuit 60 determines whether the charger 40 is ready to start charging. In other words, in S340, the charging control circuit 60 determines whether the charger 40 can charge the battery 10 based on the temperature detected by the temperature detection circuit 64, for example.

In response to determination in S340 that the charger 40 is ready to start charging, the charging control circuit 60 proceeds to S350 to command the power source circuit 62 to start charging, to thereby start charging the battery 10. On the other hand, in response to determination in S340 that the charging cannot be started, the charging control circuit 60 proceeds to S310.

In this way, the power source circuit 62 starts charging the battery 10 in response to transmission of the start-permission signal from the battery control circuit 30 to the charging control circuit 60; and to the determination in the charging control circuit 60 that the charging can be started. Here, the charging of the battery 10 is performed in a preset charging manner, such as constant current constant voltage (CCCV) charging or the like.

Accordingly, the battery control circuit 30 transmits the start-permission signal in S180. Then, the battery control circuit 30 determines for the charger 40 through respective processes in S190 to S210 whether to stop charging the battery 10.

Specifically, the battery control circuit 30 obtains in S190 a present cell temperature T of the battery 10 from the temperature detection circuit 22. In the subsequent S200, the battery control circuit 30 determines whether the present cell temperature T falls within the first range defined by the stop temperatures T1 and T4 (in other words, whether the present cell temperature T satisfies T1≤T≤T4).

If the cell temperature T does not fall within the first range, then it is necessary to stop charging. In this case, the battery control circuit 30 proceeds to S220. On the other hand, if the cell temperature T falls within the first range, then the battery control circuit 30 proceeds to S210 to determine whether a completion condition is satisfied.

In S210, the battery control circuit 30 determines whether the battery 10 is fully charged. Specifically, for example, a charging current detected through the current detection element 24 may be smaller than a preset charge-completion current value. In this case, the battery 10 may be determined to be fully charged.

In response to determination that the charging current is smaller than the charge-completion current value and the battery 10 is therefore fully charged, the battery control circuit 30 determines that the completion condition is satisfied and then proceeds to S220. On the other hand, in response to determination that the completion condition is dissatisfied, the battery control circuit 30 proceeds again to S190.

Then, S220 requires to cause the charging of the battery 10 to be stopped on the basis that the cell temperature T falls outside the first range or the completion condition is satisfied. Accordingly, the battery control circuit 30 causes the permission-output circuit 28 to transmit the completion-permission signal to the charging control circuit 60. In the subsequent S230, the battery control circuit 30 waits until the charging control circuit 60 transmits a completion signal to the battery control circuit 30. In response to receipt of the completion signal, the battery control circuit 30 proceeds to S110.

In contrast, in S350, the charging control circuit 60 causes the charging of the battery 10 to be started. In response to this, the charging control circuit 60 proceeds to S360. Then, the charging control circuit 60 determines whether the completion-permission signal is received from the battery control circuit 30.

In response to determination in S360 that the completion-permission signal is not received, the charging control circuit 60 proceeds to S370. Then, the charging control circuit 60 determines whether a stop condition is satisfied in the charger 40 based on increase in the temperature of the power source circuit 62, for example. In response to determination in S370 that the stop condition is dissatisfied, the charging control circuit 60 proceeds to S360.

On the other hand, the charging control circuit 60 proceeds to S380 in response to determination in S360 that the completion-permission signal is received or determination in S370 that the stop condition is satisfied. In S380, the charging control circuit 60 commands the power source circuit 62 to stop charging, to thereby stop charging the battery 10. In the subsequent S390, the charging control circuit 60 transmits the completion signal to the battery control circuit 30 and then proceeds to S310.

As a result, the battery control circuit 30 receives the completion signal in S230, thus detecting that the charging of the battery 10 is completed.

Here, where the stop condition is satisfied, then the charging is stopped, and then the completion signal is transmitted in the charging control circuit 60, the battery control circuit 30 receives the completion signal before transmitting the completion-permission signal. Thus, the receipt of the completion signal enables the battery control circuit 30 to detect that the charging of the battery 10 is stopped while being expected to continue, and then to store a record that indicates incompletion of the charging of the battery 10.

As explained above, in the charging system of the first embodiment, the battery control circuit 30 obtains the identification information of the charger 40 from the charging control circuit 60. Then, the battery control circuit 30 sets the first range and the second range based on the identification information.

Consequently, with the charging system of the first embodiment, the battery control circuit 30 can set the first range, which is used to determine whether to stop charging the battery 10, to be a proper temperature range that corresponds to the charging characteristic of the battery 10.

Therefore, with the charging system of the first embodiment (specifically, the battery pack 2), it is possible to inhibit a chargeable environment from being limited more than necessary due to excessive limitation of the first range. Here, the chargeable environment refers to an environment that enables the charger 40 to charge the battery 10.

In addition, the charger 40, which may include chargers with respective charging characteristics that are different from each other, can be effectively used. Consequently, it is possible to perform the battery charge with efficiency.

Here, in the first embodiment, the temperature detection circuit 22 in the battery pack 2 functions as the detector of the present disclosure, and the battery control circuit 30 in the battery pack 2 functions as the obtainer, the range setter, and the determiner of the present disclosure. Further, the charging control circuit 60 in the charger 40 functions as the stopper and the outputer of the present disclosure.

Moreover, in the battery control circuit 30, a function of the obtainer is achieved S120; a function of the range setter is achieved in S130 and S140; and a function of the determiner is achieved in S160, S170, S180, S190, S200, and S220. Further, in the charging control circuit 60, a function of the stopper is achieved in S330, S360, and S380; and a function of the outputer is achieved in S320.

Second Embodiment

In the first embodiment, it is explained that the battery pack 2 functions as the charging control device of the present disclosure. In a second embodiment, which is a modified example of the first embodiment, however, a function of the charging control device of the present disclosure is achieved by the battery pack 2 and the charger 40.

Figure 5:
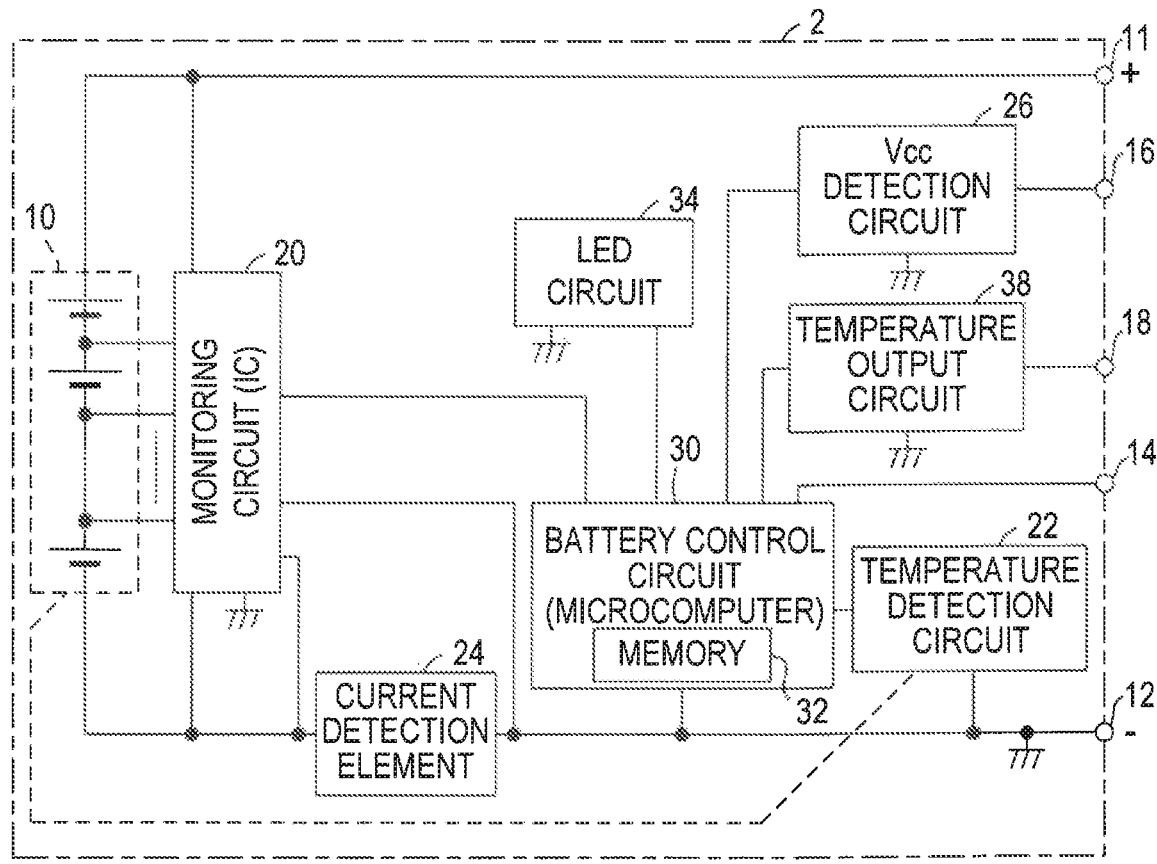
FIG. 5 is a block diagram showing a circuit configuration of a charger of a second embodiment.

In this case, as shown in FIG. 5, for example, the battery pack 2 includes a temperature output circuit 38 as a substitute for the permission-output circuit 28. The temperature output circuit 38 outputs the temperature of the battery 10 (specifically, the cell temperature) detected in the temperature detection circuit 22 from the terminal 18 to the charger 40.

Figure 6:
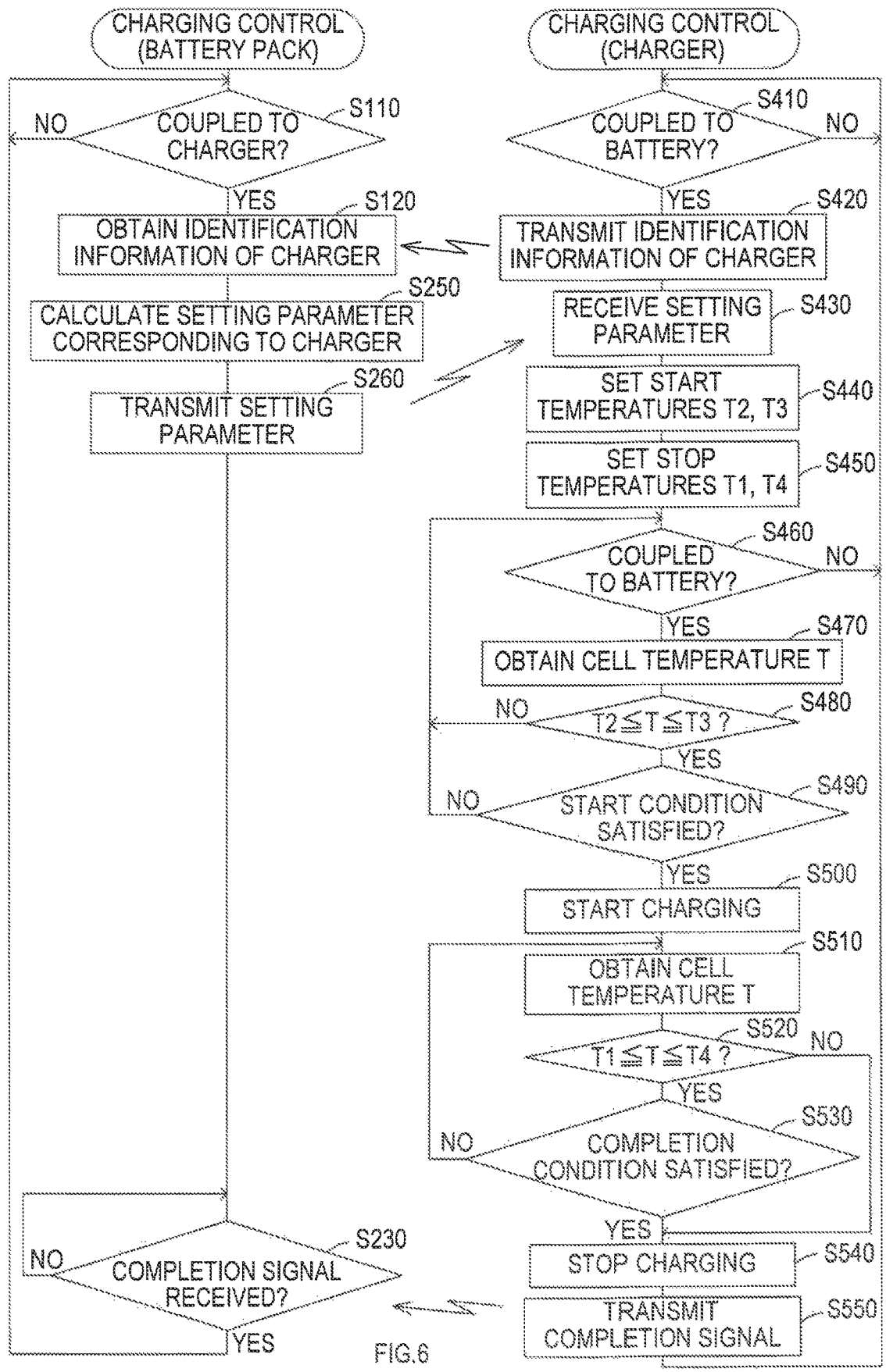
FIG. 6 is a flowchart of a charging control process executed in a battery control circuit and a charging control circuit of a second embodiment.

The battery control circuit 30 and the charging control circuit 60 execute respective charging control processes in respective procedures shown in FIG. 6.

Specifically, in response to determination in S110 of the charging control process that the battery pack 2 is coupled to the charger 40, the battery control circuit 30 proceeds to S120. The battery control circuit 30 obtains the identification information of the charger 40 from the charging control circuit 60 in S120. In response to this, the battery control circuit 30 proceed to S250.

In S250, the battery control circuit 30 calculates, based on the identification information obtained in S120, a setting parameter required for setting the start temperatures T2 and T3 and the stop temperatures T1 and T4 in the charger 40.

In the subsequent S260, the battery control circuit 30 transmits the setting parameter calculated in S250 to the charging control circuit 60 through communication with the charging control circuit 60, and then proceeds to S230. As with the first embodiment, the battery control circuit 30 waits in S230 until the charging control circuit 60 transmits the completion signal to the battery control circuit 30. In response to receipt of the completion signal, the battery control circuit 30 proceeds to S110.

In contrast, the charging control circuit 60 determines in S410 of the charging control process whether the battery pack 2 is coupled to the charger 40 based on the voltage of the terminal 58. As a result, the charging control circuit 60 waits until the battery pack 2 is coupled to the charger 40.

In response to determination that the battery pack 2 is coupled to the charger 40, the charging control circuit 60 proceeds to S420. In S420, the charging control circuit 60 transmits the identification information of the charger 40 to the battery control circuit 30 through the communication with the battery control circuit 30, and then proceeds to S430.

In S430, the charging control circuit 60 receives the setting parameter from the battery control circuit 30 and then proceeds to S440.

In S440, the charging control circuit 60 sets the start temperatures T2 and T3 based on the setting parameter. Here, these temperatures define the second range, which is suitable for starting the charging of the battery 10 using the charger 40.

In the subsequent S450, the charging control circuit 60 sets the stop temperatures T1 and T4 based on the setting parameter. Here, these temperatures define the first range, which is suitable for performing the charging of the battery 10 using the charger 40.

In S460, the charging control circuit 60 determines whether the battery pack 2 is coupled to the charger 40 based on the voltage of the terminal 58. If the battery pack 2 is not coupled to the charger 40 (in other words, if the battery pack 2 is removed from the charger 40), then the charging control circuit 60 proceeds to S410.

On the other hand, in response to determination in S460 that the battery pack 2 is coupled to the charger 40, the charging control circuit 60 proceeds to S470. In S470, the charging control circuit 60 obtains the present cell temperature T based on battery temperature information that is inputted thereto through the terminal 58.

In the subsequent S480, the charging control circuit 60 determines whether the cell temperature T obtained in S470 falls within the second range, in other words, whether the cell temperature T satisfies T2≤T≤T3. If the cell temperature T does not fall within the second range, then the charging control circuit 60 proceeds to S460.

If the cell temperature T falls within the second range, then the charging control circuit 60 proceeds to S490. In S490, the charging control circuit 60 determines whether the charger 40 satisfies a start condition based on the temperature detected by the temperature detection circuit 64, for example.

In response to determination in S490 that the charger 40 satisfies the start condition, the charging control circuit 60 proceeds to S500 to start charging the battery 10. On the other hand, in response to determination that the charger 40 dissatisfies the start condition, the charging control circuit 60 proceeds to S460.

In response to the start of the charging of the battery in S500, the charging control circuit 60 proceeds to S510 to obtain the present cell temperature T based on the battery temperature information inputted thereto through the terminal 58.

In the subsequent S520, the charging control circuit 60 determines whether the present cell temperature T obtained in S510 falls within the first range that is defined by the stop temperatures T1 and T4 (in other words, whether the present cell temperature T satisfies T1≤T≤T4).

If the cell temperature T does not fall within the first range, then the charging control circuit 60 is required to cause the charging of the battery 10 to be stopped and thus proceeds to S540. If, on the other hand, the cell temperature T falls within the first range, then the charging control circuit 60 proceeds to S530 to determine whether the completion condition is satisfied.

Here, in S530, the charging control circuit 60 determines whether, for example, the charging current supplied to the battery 10 from the power source circuit 62 is smaller than the preset charge-completion current value. Based on this, it is determined whether the completion condition is satisfied.

In response to determination in S530 that the completion condition is satisfied, charging control circuit 60 proceeds to S540. In response to determination that the completion condition is dissatisfied, the charging control circuit 60 proceeds to S510.

In S540, the charging control circuit 60 causes the power source circuit 62 to stop charging the battery 10 on the basis that, at present, the cell temperature T falls outside the first range or the completion condition is satisfied. In the subsequent S550, the charging control circuit 60 transmits the completion signal to the battery control circuit 30 and then proceeds to S410.

As explained above, in the second embodiment, the battery control circuit 30 determines, based on the identification information obtained from the charging control circuit 60, the setting parameter that is required for setting the first range and the second range in the charging control circuit 60.

Then, the charging control circuit 60 obtains the setting parameter from the battery control circuit 30, to thereby set the first range and the second range.

The charging control circuit 60 obtains the cell temperature T of the battery 10 from the battery control circuit 30 and starts charging the battery 10 if the cell temperature T falls within the second range.

Then, during the charging of the battery 10, the charging control circuit 60 monitors whether the cell temperature T is within the first range. In response to the cell temperature T falling outside the first range, the charging control circuit 60 causes the charging of the battery 10 to be stopped.

Accordingly, as with the first embodiment, the charging system of the second embodiment enables the first range to be a proper temperature range that corresponds to the charging characteristic of the charger 40, thus enabling obtainment of the same effect as the that of the first embodiment.

In the second embodiment, S250 in the charging control process executed in the battery control circuit 30 functions as the parameter setter of the present disclosure. Further, S440 and S450 in the charging control process executed in the charging control circuit 60 function as the charger setter of the present disclosure.

In other words, in the second embodiment, the function of the range setter of the present disclosure is achieved in S250 executed in the battery control circuit 30 and in S450 executed in the charging control circuit 60. Moreover, in the second embodiment, the function of the controller of the present disclosure is achieved in S470, S480, S510, S520, and S540, and the function of the outputer of the present disclosure is achieved in S420 performed in the charging control circuit 60.

Although embodiments for practicing the present disclosure has been described above, the present disclosure is not limited to the above-described embodiments and may be practiced in various forms.

For example, the aforementioned embodiments have been explained that the cell temperature of the battery 10 is used to determine whether the battery temperature falls within the first range. However, the battery temperature to be used may be a temperature of an outer wall of the battery 10 or a peripheral temperature of the battery 10.

In addition, two or more functions of one element in the aforementioned embodiment may be achieved by two or more elements; or one function of one element in the aforementioned embodiment may be achieved by two or more elements. Likewise, two or more functions of two or more elements may be achieved by one element; or one function achieved by two or more elements may be achieved by one element. A part of the configuration of the aforementioned embodiment may be omitted; and at least a part of the configuration of the aforementioned embodiment may be added to or replaced with another part of the configuration of the aforementioned embodiment. It should be noted that any and all modes that are encompassed in the technical ideas that are defined only by the languages in the claims are embodiments of the present disclosure.

What is claimed is:
1. A charging control device, comprising:
a battery pack that contains a battery; and
a charger configured to charge the battery,
wherein the battery pack includes:
a detector configured to detect a temperature of the battery;
a determiner configured to determine, during the charging of the battery by the charger, whether the temperature of the battery detected in the detector falls outside a first range, the first range including a first temperature as a minimum value and a second temperature as a maximum value;
an obtainer configured to obtain, from the charger, identification information that is capable of identifying a charging characteristic of the charger; and
a range setter configured to set at least one of the first temperature and the second temperature such that the first range is a temperature range that corresponds to the charging characteristic of the charger, the charging characteristic of the charger being indicated by the identification information obtained in the obtainer,
wherein the charger includes a stopper configured to cause the charger to stop charging the battery in response to determining that the temperature of the battery falls outside the first range by the determiner.

2. The charging control device according to claim 1, wherein the determiner is further configured to determine whether the temperature of the battery detected in the detector falls outside a second range in starting the charging of the battery by the charger,
wherein the stopper is further configured to cause the charger not to start charging the battery in response to determination by the determiner that the temperature of the battery falls outside the second range in starting the charging of the battery, and
wherein the range setter is further configured to set, based on the identification information obtained in the obtainer, the second range as a temperature range that corresponds to the charging characteristic of the charger.

3. The charging control device according to claim 2, wherein the minimum value of the second range is equal to or greater than the minimum value of the first temperature of the first range, and the maximum value of the second range is equal to or smaller than the maximum value of the second temperature of the first range.

4. The charging control device according to claim 1, wherein the determiner is configured to repeatedly determine, during the charging of the battery by the charger, whether the temperature of the battery detected in the detector falls outside the first range.

5. The charging control device according to claim 1, wherein the charger further includes an outputter that is configured to output the identification information that is capable of identifying the charging characteristic of the charger in response to the charger being coupled to the battery, and
wherein the obtainer is configured to obtain the identification information that is outputted from the outputter and is capable of identifying the charging characteristic of the charger.

6. The charging control device according to claim 1, wherein the charging characteristic is associated with a charging current or a charging voltage outputted from the charger.

7. The charging control device according to claim 1, wherein the battery is used for a power equipment for working sites.

8. A charging control device comprising:
a battery pack that contains a battery; and
a charger configured to charge the battery,
wherein the battery pack includes:
 a detector configured to detect a temperature of the battery;
 an obtainer configured to obtain, from the charger, identification information that is capable of identifying a charging characteristic of the charger; and
 a parameter setter configured to set, based on the charging characteristic of the charger being indicated by the identification information obtained in the obtainer, a setting parameter required for setting at least one of a first temperature, which is a minimum value of a first range, and a second temperature, which is a maximum value of the first range, the first range being a temperature range that enables charging of the battery;
wherein the charger includes:
 a controller configured to obtain the temperature of the battery from the detector and to cause the charging of the battery to be stopped in response to the temperature falling outside the first range during the charging of the battery; and
 a charger setter configured to obtain the setting parameter from the parameter setter, and to set at least one of the first temperature and the second temperature based on the setting parameter.

9. The charging control device according to claim 8, wherein the controller is further configured to determine whether the temperature of the battery detected in the detector falls outside a second range in starting the charging of the battery by the charger and to cause, in response to a positive determination, the charger not to start charging the battery,
wherein the parameter setter is further configured to set, based on the identification information obtained in the obtainer, a setting parameter required for setting the second range as a temperature range that corresponds to the charging characteristic of the charger, and
wherein the charger setter is further configured to set the second range based on the setting parameter set in the parameter setter.

10. The charging control device according to claim 8, wherein the controller is configured to repeatedly determine, during the charging of the battery by the charger, whether the temperature of the battery detected in the detector falls outside the first range.

11. The charging control device according to claim 8, wherein the charging characteristic is associated with a charging current or a charging voltage outputted from the charger.

12. The charging control device according to claim 8, wherein the battery is used for a power equipment for working sites.

13. A battery pack, comprising:
a battery;
a detector configured to detect a temperature of the battery;
a determiner configured to determine, during charging of the battery by a charger, whether the temperature of the battery detected in the detector falls outside a first range, the first range including a first temperature as a minimum value and a second temperature as a maximum value, the first range being used by the determiner for determination;
an obtainer configured to obtain, from the charger, identification information that is capable of identifying a charging characteristic of the charger; and
a range setter configured to set, at least one of the first temperature and the second temperature such that the first range is a temperature range that corresponds to the charging characteristic of the charger, the charging characteristic of the charger being indicated by the identification information obtained in the obtainer.

14. A charger configured to charge a battery contained in a battery pack,
wherein the battery pack includes:
a battery;
a detector configured to detect a temperature of the battery;
a determiner configured to determine, during charging of the battery by the charger, whether the temperature of the battery detected in the detector falls outside a first range, the first range including a first temperature as a minimum value and a second temperature as a maximum value, the first range being used by the determiner for determination;
an obtainer configured to obtain, from the charger, identification information that is capable of identifying a charging characteristic of the charger; and
a range setter configured to set at least one of the first temperature and the second temperature such that the first range is a temperature range that corresponds to the charging characteristic of the charger, and
wherein the charger further includes a stopper configured to cause the charger to stop charging the battery in response to determining that the temperature of the battery falls outside the first range by the determiner.

15. A battery pack, comprising:
a battery;
a detector configured to detect a temperature of the battery;
an obtainer configured to obtain, from a charger, identification information that is capable of identifying a charging characteristic of the charger; and
a parameter setter configured to set a setting parameter required for setting at least one of a first temperature, which is a minimum value of a first range, and a second temperature, which is a maximum value of the first range, based on the charging characteristic of the charger being indicated by the identification information obtained in the obtainer, the first range being a temperature range that enables charging of the battery.

16. A charger configured to charge a battery contained in a battery pack,
wherein the battery pack includes:
a battery;
a detector configured to detect a temperature of the battery;
an obtainer configured to obtain, from a charger, identification information that is capable of identifying a charging characteristic of the charger; and
a parameter setter configured to set a setting parameter required for setting at least one of a first temperature, which is a minimum value of a first range, and a second temperature, which is a maximum value of the first range, based on the charging characteristic of the charger being indicated by the identification information obtained in the obtainer, the first range being a temperature range that enables charging of the battery, and
wherein the charger further includes:
a controller configured to obtain the temperature of the battery from the detector included in the battery pack and to cause the charging of the battery to be stopped in response to the temperature falling outside the first range during the charging of the battery, the first range being used for the controller to cause the charging of the battery to be stopped; and
a charger setter configured to obtain the setting parameter from the parameter setter included in the battery pack and to set at least one of the first temperature and the second temperature based on the setting parameter.

* * * * *